United States Patent [19]

Ito et al.

[11] Patent Number: 5,134,687
[45] Date of Patent: Jul. 28, 1992

[54] METHOD FOR CONVERTING IMAGE DATA INTO DOT DATA

[75] Inventors: Yousuke Ito; Ichiro Sasaki, both of Nagoya, Japan

[73] Assignee: Brother Kogyo Kabushiki Kaisha, Japan

[21] Appl. No.: 482,884

[22] Filed: Feb. 22, 1990

[30] Foreign Application Priority Data

Feb. 28, 1989 [JP] Japan .................................. 1-47034

[51] Int. Cl.⁵ .............................................. G06F 15/62
[52] U.S. Cl. ..................................................... 395/141
[58] Field of Search ................ 364/518, 522; 340/728, 340/730, 747, 728, 730, 747; 395/141

[56] References Cited

U.S. PATENT DOCUMENTS

| | | | |
|---|---|---|---|
| 4,780,711 | 10/1988 | Doumas | 340/728 |
| 4,815,009 | 3/1989 | Blatin | 364/518 |
| 4,904,994 | 2/1990 | Sasser et al. | 340/747 X |
| 4,931,785 | 6/1990 | Ishii | 340/747 X |
| 5,018,217 | 5/1991 | Yoshida et al. | 340/728 X |

Primary Examiner—Gary V. Harkcom
Assistant Examiner—Mark K. Zimmerman
Attorney, Agent, or Firm—Oliff & Berridge

[57] ABSTRACT

A method of converting image outline data representative of segments defining an outline of an image area to be reproduced, into dot data representative of image dots which collectively represent the image area. In the method, the outline of the image area is superimposed on a coordinated pixel screen wherein a plurality of vertical pixel lines and a plurality of horizontal pixel lines cooperate to provide intersections defining a matrix of dot positions which are selectively used as the image dots. The vertical and horizontal pixel lines form a plurality of sections each having four corners defined by the respective four intersections of the pixel lines. Each one of the plurality of sections is determined as a relevant section if any one of the segments of the outline of the image area passes through the relevant section. The dot data are prepared such that the dot data represents the presence of the image dot at a predetermined one of four corners of each relevant section.

9 Claims, 4 Drawing Sheets

METHOD FOR CONVERTING IMAGE DATA INTO DOT DATA

BACKGROUND OF THE INVENTION

1. Field of the Invention

The present invention relates to improvements in a method of converting image outline data representative of an outline of an image such as characters (letters and symbols) and graphical representations, into dot data representative of dots which collectively define the image, so that the image is drawn by a digital plotter, recorded by a laser printer, displayed on a CRT display device, or otherwise presented by any other suitable output device.

2. Discussion of the Prior Art

In a known method of converting an image outline data (e.g., in the form of vector data) into dot data for dot-matrix representation of an image area, a coordinated pixel screen is used such that an outline of the image area is superimposed on the pixel screen. As shown in FIG. 8, the pixel screen is defined by a plurality of parallel vertical pixel lines 50 and a plurality of parallel horizontal pixel lines 52, which cooperate to define a matrix 53 of intersections 54 corresponding to dot positions. The outline of the image area as indicated at 55 in FIG. 8 is defined by a plurality of segments. In preparing the dot data from the image outline data, the intersections or dot positions 54 which lie within the image outline superimposed on the pixel screen (matrix 53) are selected as image-dot positions as indicated at 56 in FIG. 8. The method is adapted to prepare the dot data which are representative of the thus selected image-dot positions 56 or indicative of the presence of dots at these positions.

The image area 55 is reproduced according to the prepared dot data, as a group of the dots at the image-dot positions 56, as indicated by hatched circles in FIG. 8.

In the case of an image area 58 having a relatively small width as shown in FIG. 9, for example, no dot positions 54 lie within the outline of the image area. In this case, dot data cannot be prepared, and the image area 58 is not represented by image dots. To avoid this situation, the dot data are conventionally prepared according to a special rule such that the dot positions 54 outwardly adjacent to the outline of the image area 58 are selected as the image dots 56.

However, the preparation of the dot data according to the special rule as described above requires a complicated control program for conversion of the image outline data into the corresponding dot data. The use of the special rule is not desirable. Further, the procedure to determine the image dots 56 outside the outline of the image area 58 as shown in FIG. 9 is more cumbersome and complicated than the procedure to determine the image dots 56 inside the outline of the image area 55 as illustrated in FIG. 8. In the case of FIG. 9, the preparation of the relevant dot data requires the selection of certain ones of the dot positions 54 outside the image outline 58, which meet a predetermined requirement. For instance, the predetermined requirement is a predetermined distance between the dot positions 54 and the outline (a plurality of straight segments) of the image area 58. In this case, the preparation of dot data requires a step of selecting the dot positions 54 which are located over a range of the predetermined distance, and tends to be considerably complicated.

SUMMARY OF THE INVENTION

It is therefore an object of the present invention to provide a simple method of preparing dot data by conversion from corresponding image outline data, in the same manner for both of a relatively narrow image area and a relatively wide image area.

The above object may be achieved according to the principle of the present invention, which provides a method of converting image outline data representative of segments defining an outline of an image area to be reproduced, into dot data representative of image dots which collectively represent the image area, comprising the steps of: superimposing the outline of the image area on a coordinated pixel screen wherein a plurality of vertical pixel lines and a plurality of horizontal pixel lines cooperate to provide intersections defining a matrix of dot positions which are selectively used as the image dots, the vertical and horizontal pixel lines forming a plurality of sections each having four corners defined by the respective four intersections of the pixel lines; determining each one of the plurality of sections as a relevant section if any one of the segments of the outline of the image area passes through each one section; and preparing the dot data such that the dot data represent the presence of the image dot at a predetermined one of four corners of the relevant section.

In the method of the present invention as described above, one image dot is formed for each relevant section of the pixel screen through or in which each segment of the image outline passes. Accordingly, the dot data for an image area having a small width may be prepared in the same manner as the dot data for an image area which has a large width. Thus, no special data converting procedure is required for preparing the dot data for such narrow image area.

Further, the conversion of the outline data into the dot data is carried out by simply selecting the relevant sections of the pixel screen through which each segment of the outline of the image area passes or extends, so that the dot data to be prepared represents the presence of an image dot at a predetermined one of the four corners of each relevant section. Thus, the positions of the image dots collectively representing the appropriate image area are automatically determined with a simple procedure, whereby the conversion of the outline data into the dot data can be effected at an increased speed.

The present method may further comprise a step of determining whether there exists at least one dot position which is surrounded by external image dots which consist of the image dots each corresponding to the predetermined one corner of each relevant section of the pixel screen, and a step of selecting the at least one dot position surrounded by the external image dots, as at least one internal image dot which cooperates with the external image dots to represent the image area.

Each one of the sections of the pixel screen may be determined as the relevant section if one of start and end points of each of the segments of the outline of the image area lies in that each one section. In this case, one of the sections of the pixel screen which is located on one of opposite sides of a pixel line of the screen is determined as the relevant section, if one of the start and end points of each the segment lies on that pixel line.

The determination of the relevant section may be effected by calculating coordinates of intersections between each segment of the outline of the image area and the vertical and horizontal pixel lines, and by determining the relevant section based on the calculated coordinates of the intersections between each segment and the pixel lines.

The determination of the relevant section may include a step of determining whether each segment intersects at least one of the vertical and horizontal pixel lines. The determination may be effected such that the section in which the start and end points of the given segment of the outline lie is the only one relevant section for the given segment. Also, the determination may include a step of determining whether there exists one of two conditions which consists of a first condition in which each segment lies between the two adjacent vertical pixel lines, and a second condition in which each segment lies between the two adjacent horizontal pixel lines. If one of the two conditions exists, the sections in which the start and end points of the relevant segment lie, and each of at least one section which is located between the above-indicated start and end points, are determined as the relevant sections.

To avoid an excessive deviation of the image dots from the outline of the image area, the outline may preferably be superimposed on the coordinated pixel screen such that the outline of the image area is offset from a nominal position along the vertical pixel lines and along the horizontal pixel lines, in directions from the predetermined one corner of the relevant section toward the corners adjacent to the predetermined one corner of the relevant section, by distances equal to lengths of sides of the relevant section which are parallel to the vertical and horizontal pixel lines, respectively.

BRIEF DESCRIPTION OF THE DRAWINGS

The above and other objects, features and advantages of the present invention will become more apparent by reading the following detailed description of presently preferred embodiments of the invention, when considered in connection with the accompanying drawings, in which.

DETAILED DESCRIPTION OF THE PREFERRED EMBODIMENTS

Figure 1:
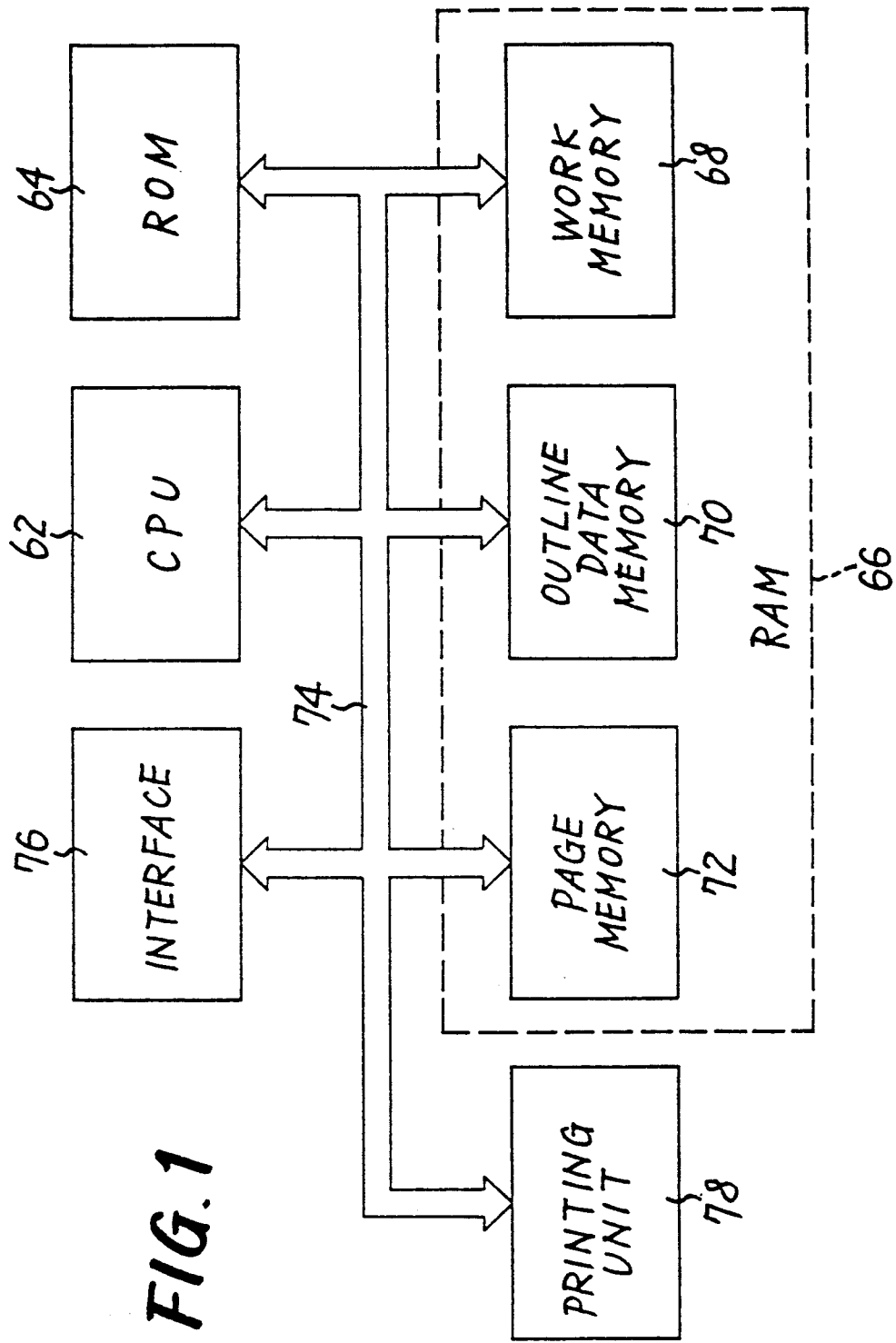
FIG. 1 is a schematic block diagram showing an electric control system of a laser printer which is adapted to practice one embodiment of the method of the present invention.

Referring first to FIG. 1, the electric control system of a laser printer adapted to practice the principle of the present invention uses a microcomputer which includes a CPU 62 (central processing unit), a ROM 64 (read-only memory) and a RAM 66 (random-access memory). The ROM 64 stores various control programs such as a data conversion control program as illustrated in the flow chart of FIG. 4. The RAM 66 incorporates a WORK memory 68, an OUTLINE DATA memory 70, and a PAGE memory 72. The WORK memory 68 is used to temporarily store results of arithmetic operations by the CPU 62. The OUTLINE DATA memory 70 stores image outline data in the form of vector data which represent segments defining an outline of an image area to be reproduced. The PAGE memory 72 stores a batch of dot data corresponding to one page of text or images. The dot data are prepared by conversion from the vector data stored in the OUTLINE DATA memory 70, such that the dot data represent image dots which collectively represent the image area.

To the CPU 62, there are connected an interface 76 and a printing unit 78. The interface 76 is connected to a suitable data supply device such as a word processor or personal computer, so that the vector data supplied from the data supply device is stored into the OUTLINE DATA memory 70 of the laser printer. A batch of dot data corresponding to each page of the text to be printed by the laser printer is prepared from the vector data, and stored in the PAGE memory 72. The sets of dot data corresponding to respective lines of the text are transferred one after another from the PAGE memory 72 to the printing unit 78, so that the lines of images are printed on a recording medium, with a matrix of dots formed by laser beams according to the dot data.

Figure 2:
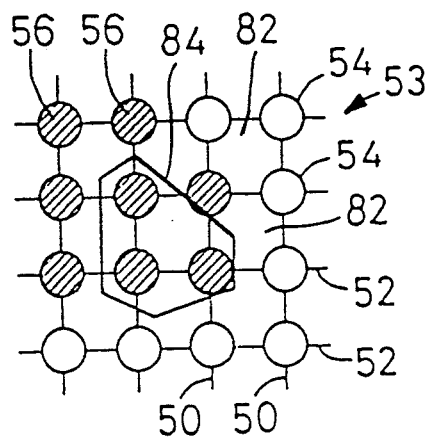
FIGS. 2 and 3 are views illustrating two examples of relationships between an outline of an image area represented by image outline data, and image dot positions represented by dot data, when the image outline data are converted to the dot data according to the present invention.
Figure 3:
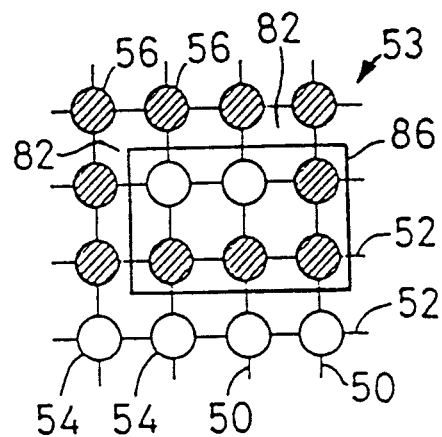

Referring to FIGS. 2 and 3, there are illustrated examples of conversion of the image outline data in the form of the vector data into the dot data used for the laser printing. The vector data consist of a plurality of vectors each of which defines start and end points of each straight line segment of the outline of an image area such as a stroke of a character. In other words, the outline of the image area is defined by a plurality of straight line segments each defined by a set of vector data. The outline of the image area is superimposed on a coordinated pixel screen wherein a multiplicity of vertical (y-axis) pixel lines 50 and a multiplicity of horizontal (x-axis) pixel lines 52. These vertical and horizontal pixel lines 50, 52 cooperate to form a multiplicity of intersections 54 representative of the centers of picture elements which define a matrix 53 of dot positions that are selectively used as image dots. The reference numeral 54 denotes either the intersections of the screen or the dot positions, as appropriate. The vertical and horizontal pixel lines 50, 52 are perpendicular to each other, and are equally spaced apart from each other, so that the vertical and horizontal pixel lines 50, 52 form a multiplicity of square sections 82. That is, the four sides of each square section 82 of the matrix 53 have the same length.

FIG. 2 shows an outline of an image area 84 which is represented by the first group of vector data stored in the OUTLINE DATA memory 70 and which is superimposed on the dot matrix 53 of the pixel screen. As indicated in FIG. 2, the image outline 84 consists of six straight line segments which pass through eight sections 82 of the screen. Each of these eight sections 82 is selected or determined, and referred to as a "relevant section". The dot data for this first group of vector data as the image outline data are prepared such that the dot data represent the presence of image dots 56 at a predetermined one of the four corners of each of the eight relevant sections 82. In the present embodiment, an image dot 56 is formed or positioned at the upper left corner of each relevant section 82, as indicated in FIG. 2. The dot data corresponding to each picture element which corresponds to each intersection or dot position 54 consists of a bit. The bit is set to "1" if the image dot 56 is present at the appropriate dot position 54, and set to "0" if the image dot 56 is not present at the appropriate dot position 54.

According to the above rule, the vector data representing the outline of the image area 84 is converted into the corresponding dot data, and the image dots 56 are formed according to the obtained dot data so that the image dots 56 collectively represent the image area 84. In the same manner, a rectangular image area 86 indicated in FIG. 3 is printed as a group of image dots 56 formed according to the appropriate dot data. In this case, two internal dot positions 54 are surrounded by ten external image dots 56 corresponding to the upper left corners of the respective ten relevant sections 82 which are determined according to the rule described above. In this case, the dot data are prepared so that image dots are formed also at the two internal dot positions 54.

Figure 5:
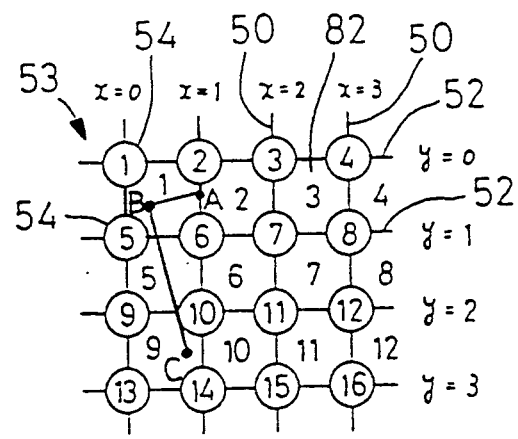
FIG. 5 is a view indicating an example of a data processing operation according to the program illustrated in the flow chart of FIG. 4.

Referring next to the flow chart of FIG. 4, there will be described in detail a manner in which vector data representing straight lines AB and BC shown in FIG. 5 are converted into corresponding dot data. In the pixel screen as shown in FIG. 5, the leftmost vertical pixel line 50 is the y axis while the uppermost horizontal pixel line 52 is the x axis. In the thus established x-y coordinate system of the pixel screen, Point A is represented by coordinate values (1, 0.3), Point B by coordinate values (0.2, 0.5) and Point C by coordinate values (0.8, 2.5).

Figure 4:
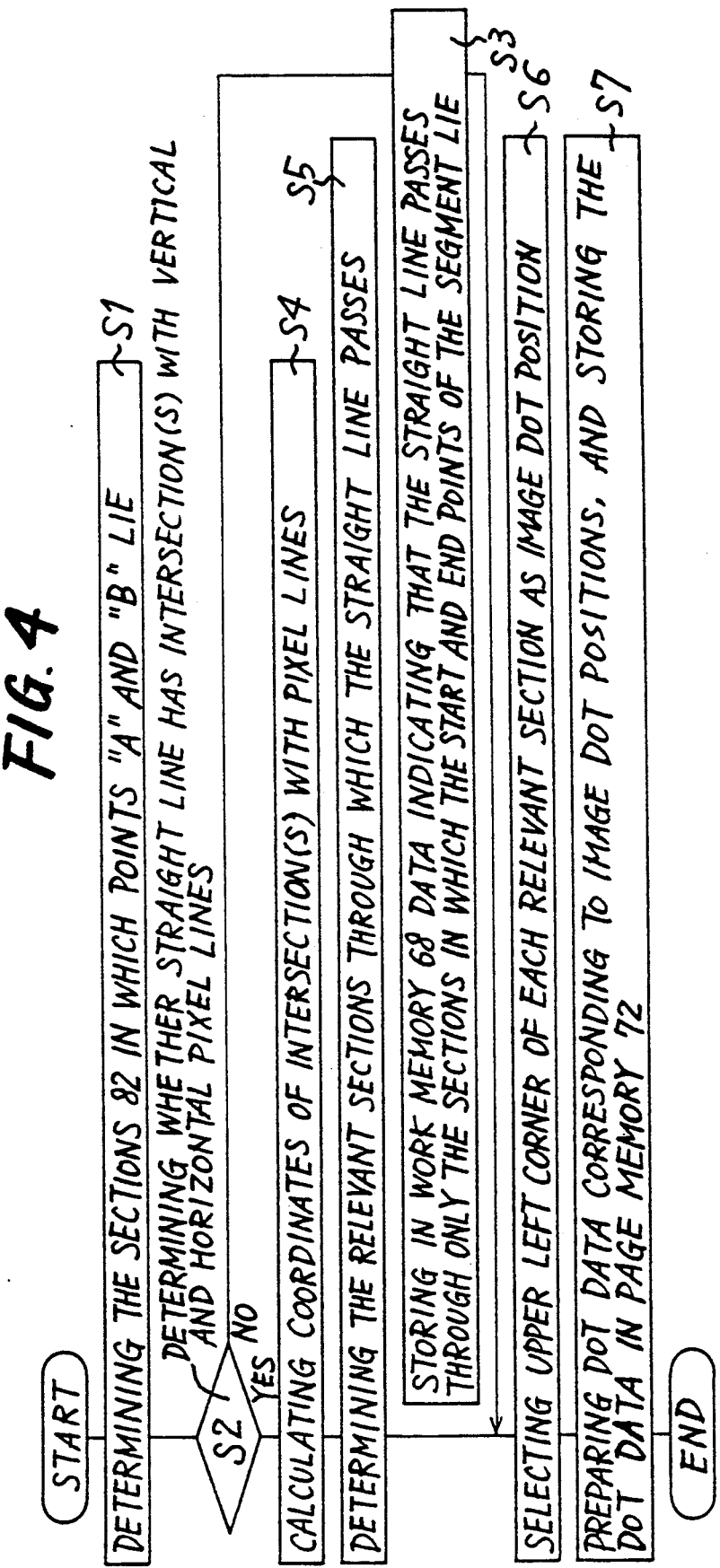
FIG. 4 is a flow chart illustrating a portion of a control program stored in a read-only memory of the control system, which portion is relevant to the data conversion according to the invention.

Initially, the control flow executes step S1 of the flow chart of FIG. 4, to determine the sections 82 in which the start and end points A and B of the straight lines AB lie. In this specific example, the start point A lies on the vertical pixel line 50 whose x-axis coordinate is equal to "1". If the start or end point lies right on one of the vertical pixel lines 50, as in this case, the section 82 to the right of the appropriate pixel line 50 is selected as the relevant section. If the start or end point lies right on one of the horizontal pixel lines 52, the section 82 just below the appropriate pixel line 52 is selected as the relevant section.

Suppose the coordinate values of Point A are (Ax, Ay), the inequalities $1 \leq Ax < 2$, and $0 \leq Ay < 1$ are both satisfied. Consequently, the start point A is determined to lie in the second section 82 (indicated at 2 in FIG. 5). Similarly, suppose the coordinate values of Point B are (Bx, By), the inequalities $0 \leq Bx < 1$, and $0 \leq By < 1$ are both satisfied. Consequently, the end point B is determined to lie in the first section 82 (indicated at 1 in FIG. 5).

Then, the control flow goes to step S2 to determine whether the straight line AB intersects any one of the vertical and horizontal pixel lines 50, 52, or not. Since the straight line AB does not intersect any pixel lines 50, 52 except for the start point A lying on the pixel line 50 ($x=1$), a negative decision (NO) is obtained in step S2. Accordingly, step S2 is followed by step S3 in which data indicating that the first and second sections 82 indicated at 1 and 2 in FIG. 5 are the relevant sections is stored in the WORK memory 68. Namely, only the two sections in which the start and end points A and B lie are selected as the relevant sections. Then, the control flow goes to step S6 in which the upper left corners of the two relevant sections 82 are determined as image dot positions at which the image dots are formed. In the next step S7, the data bits at the memory locations of the PAGE memory 72 which correspond to the selected image dot positions are set to "1", to represent the presence of the image dots at the above-indicated upper left corners of the relevant sections 82. Thus, the conversion of the vector data into the dot data for the straight line AB is completed.

Steps S1 and S2 are repeated for the straight line BC. The y-axis coordinate values of the start and end points B and C have a difference larger than "1". This means that the line BC intersects at least two horizontal pixel lines 52. Therefore, an affirmative decision (YES) is obtained in step S2, and the control flow goes to step S4 to calculate the coordinates of the intersections between the straight line BC and the vertical and horizontal pixel lines 50, 52. In this specific case, however, the x-axis coordinate values of the start and end points B and C are both between "0" and "1". This means that the straight line BC does not intersect any vertical pixel lines 50. Namely, the straight line BC intersects only the two horizontal pixel lines 52 ($y=1$) and ($y=2$). In this case, therefore, it is not necessary to calculate in step S4 the coordinate values of the intersections between the straight line BC and the horizontal pixel lines 52, in order to determine in step S5 the relevant sections 82 through which the line BC passes. However, if a straight line intersects both the vertical pixel lines 50 and the horizontal pixel lines 52, the coordinate values of the intersections of the straight line and the pixel lines 50, 52 should be calculated to determine the relevant sections 82. That is, the calculation in step S4 should be executed where both the x-axis coordinate values and the y-axis coordinate values of the start and end points of the straight line have differences greater than "1", since in this case the relevant sections 82 through which the straight line passes cannot be determined without calculating the coordinates of the intersections of the straight line and the pixel lines 50, 52.

In step S5, the relevant sections 82 through which the straight line 82 passes are determined based on the result of calculation in step S4. In this specific case, the sections 82 indicated at 1, 5 and 9 in FIG. 5 are determined as the relevant sections, and the data indicative of these relevant sections are stored in the WORK memory 68. In step S6, the upper left corners of the determined relevant sections 82 (indicated at 1, 5 and 9 in FIG. 5) are selected as the image dot positions at which the image dots are formed. In step S7, the data bits in the PAGE memory 72 which correspond to the image dot positions are set to "1" to represent the image dots to be formed. Thus, the vector data corresponding to the straight line BC is converted into the corresponding dot data stored in the PAGE memory 72.

The data conversion routine as illustrated in the flow chart of FIG. 4 is repeated for each segment of the outlines of image areas, whereby a batch of vector data corresponding to one page of text stored in the OUTLINE DATA MEMORY 70 are converted into the corresponding batch of dot data stored in the PAGE memory 72. The sets of dot data representative of lines of images are transferred one after another from the PAGE memory 72 to the printing unit 78, whereby the respective lines of images are printed with a matrix of image dots formed at the appropriate positions on the recording medium by laser beam irradiation according to the dot data.

For easy understanding, the data conversion and the subsequent printing have been described above such that the sets of dot data corresponding to respective lines of images are supplied one after another to the printing unit 78, after the batch of dot data prepared by conversion from the vector data has been stored in the PAGE memory 72. Generally, however, the conversion of the vector data into the dot data can be accomplished in a short time. Therefore, it is possible that while a line of images is printed by the printing unit 78, the data conversion for the next line of images may be effected. In this case, the dot data prepared by conversion from the vector data may be directly supplied to the printing unit 78, without being temporarily stored in the PAGE memory 72. However, the PAGE memory 72 is used where the data conversion for a specific line of images of one page of text requires a relatively long time.

Figure 6:
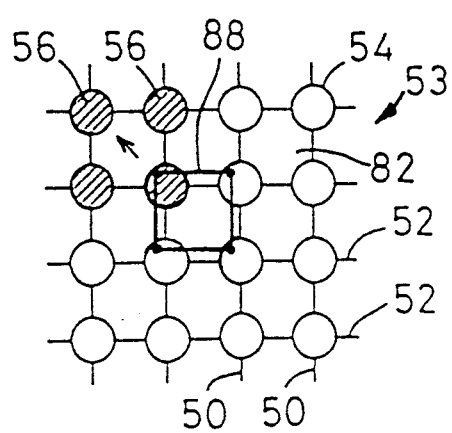
FIG. 6 is a view illustrating a case where there arises a considerably large deviation of the image dot positions represented by the dot data prepared according to the program of FIG. 4, from the image outline represented by the image outline data.
Figure 7:
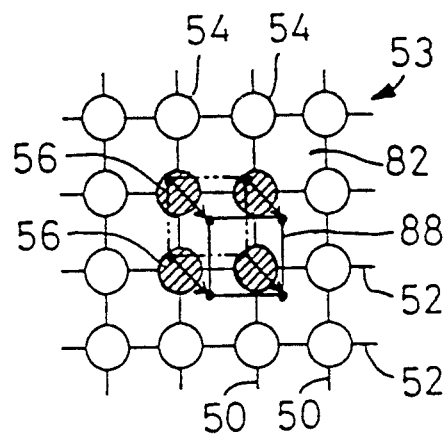
FIG. 7 is a view showing a modified form of the method to reduce the deviation of FIG. 6.
Figure 8:
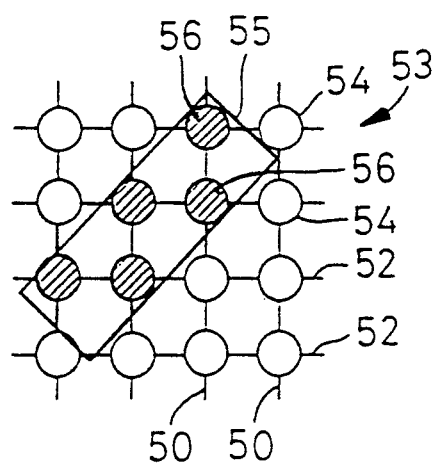
FIGS. 8 and 9 are views indicating relationships between the image outline represented by image outline data and the image dot positions represented by dot data which are prepared according to a known method.
Figure 9:
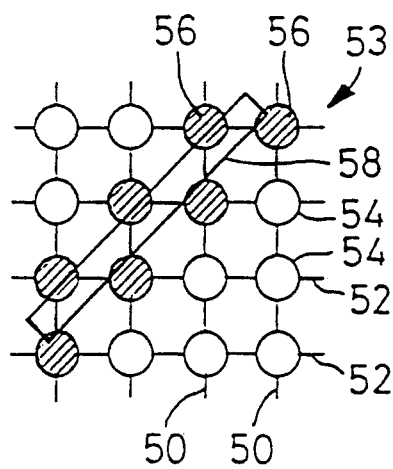

In the above embodiment, the image dot 56 is formed at the upper left corner of each relevant section 82 through which a segment of the image outline represented by vector data at least partially passes. Namely, the upper left corner of the relevant section is used irrespective of a part of the relevant section through which the segment passes or extends. According to this arrangement, the positions of the image dots 56 are deviated from the nominal position determined by the image outline, by an average distance of 0.5 (half of the length of each side of the sections 82), in both x-axis and y-axis directions. In the case of an image outline 88 as superimposed on the pixel screen, as indicated in FIG. 6, the deviation distance is almost equal to "1" (spacing between the adjacent pixel lines). For reducing this deviation distance or zeroing the average deviation distance, it is desirable to superimpose the image outline 88 on the pixel screen as shown in FIG. 7, such that the image outline 88 is offset or translated from the nominal position along the vertical and horizontal pixel lines 50, 52, in the right and downward directions (away from the predetermined upper left corner of the relevant section 82), by a distance equal to one-half of the length of each side of the square sections 82. This translation is effected before the vector data is converted into the dot data as described above.

While the present invention has been described in its presently preferred embodiments with a certain degree of particularity, it is to be understood that the invention is not limited to the details of the illustrated embodiments, but may be embodied with various changes, modifications and improvements, which may occur to those skilled in the art, without departing from the scope and spirit of the invention defined in the appended claims. For instance, the outline of an image area represented by image outline data (vector data) may be defined by curved line segments in place of or in addition to the straight line segments. Further, any one of the four corners of each relevant section 82 may be used as the image dot position at which the image dot 56 is formed.

What is claimed is:

1. A method of converting image outline data representative of segments defining an outline of an image area to be reproduced, into dot data representative of image dots which collectively represent said image area, comprising the steps of:

superimposing said outline of the image area on a coordinated pixel screen wherein a plurality of vertical pixel lines and a plurality of horizontal pixel lines cooperate to provide intersections representative of centers of respective picture elements at which are selectively placed said image dots, said vertical and horizontal pixel lines forming a plurality of sections, each one of said plurality of sections having four corners defined by the respective four intersections of said pixel lines;

determining each one of said plurality of sections as a relevant section if any one of said segments of said outline of the image area passes through said each one of said plurality of sections; and preparing said dot data such that the dot data represents a presence of said image dot at a picture element represented by a predetermined one of four corners of each said relevant section.

2. A method according to claim 1, further comprising:

determining whether there exists at least one picture element which is surrounded by external image dots, said external image dots consist of said image dots each corresponding to said predetermined corner of said each relevant section of said pixel screen; and selecting said at least one picture element surrounded by said external image dots, as at least one internal image dot which cooperates with said external image dots to collectively represent said image area.

3. A method according to claim 1, wherein said step of determining each one of said plurality of sections as a relevant section comprises determining each one of said plurality of sections as said relevant section if one of start and end points of each of said segments of said outline of the image area lies in said each one section.

4. A method according to claim 3, wherein one of said sections of said pixel screen which is located on a predetermined one of opposite sides of a pixel line of the screen is determined as said relevant section, if one of said start and end points of each said segment lies on said pixel line.

5. A method according to claim 1, wherein said step of determining each one of said plurality of sections as a relevant section comprises calculating coordinates of intersections between each said segment and said vertical and horizontal pixel lines, and determining said relevant section based on the calculated coordinates of said intersections between each said segment and said pixel lines.

6. A method according to claim 1, wherein said step of determining each one of said plurality of sections as a relevant section comprises determining whether each said segment intersects at least one of said vertical and horizontal pixel lines.

7. A method according to claim 6, wherein said step of determining each one of said plurality of sections as a relevant section further comprises determining that the section in which a start point and an end point of a given segment of said outline of image area lie is the only one relevant section for said given segment.

8. A method according to claim 6, wherein said step of determining each one of said plurality of sections as a relevant section further comprising: determining whether there exists one of two conditions which consists of a first condition in which each said segment lies between two adjacent one of said plurality of vertical pixel lines, and a second condition in which each said segment lies between two adjacent ones of said plurality of horizontal pixel lines; and if one of said two conditions exists, determining as said relevant section each of the sections in which a start point and an end point of each said segment lie and at least one section which is located between said start and end points.

9. A method according to claim 1, wherein said step of superimposing said outline of the image area on a coordinated pixel screen is effected such that said outline of said image area is offset from a nominal position in directions from said predetermined one corner of said relevant section toward the corners adjacent to said predetermined one corner of said relevant section, along said vertical pixel lines and along said horizontal pixel lines, by distances equal to one-half of lengths of sides of said relevant section parallel to said vertical and horizontal pixel lines, respectively.

* * * * *